Oct. 3, 1967

J. G. HAUSER ETAL 3,345,549

RECTIFIER BRIDGE ADJUSTABLE ALTERNATING
CURRENT VOLTAGE CONTROL

Filed March 9, 1965

INVENTORS.
JOHN G. HAUSER
JOHN D. STEADMAN
BY
Lieber & Nilles
ATTORNEYS

INVENTORS.
JOHN G. HAUSER
JOHN D. STEADMAN
BY
Lieber & Nilles
ATTORNEYS

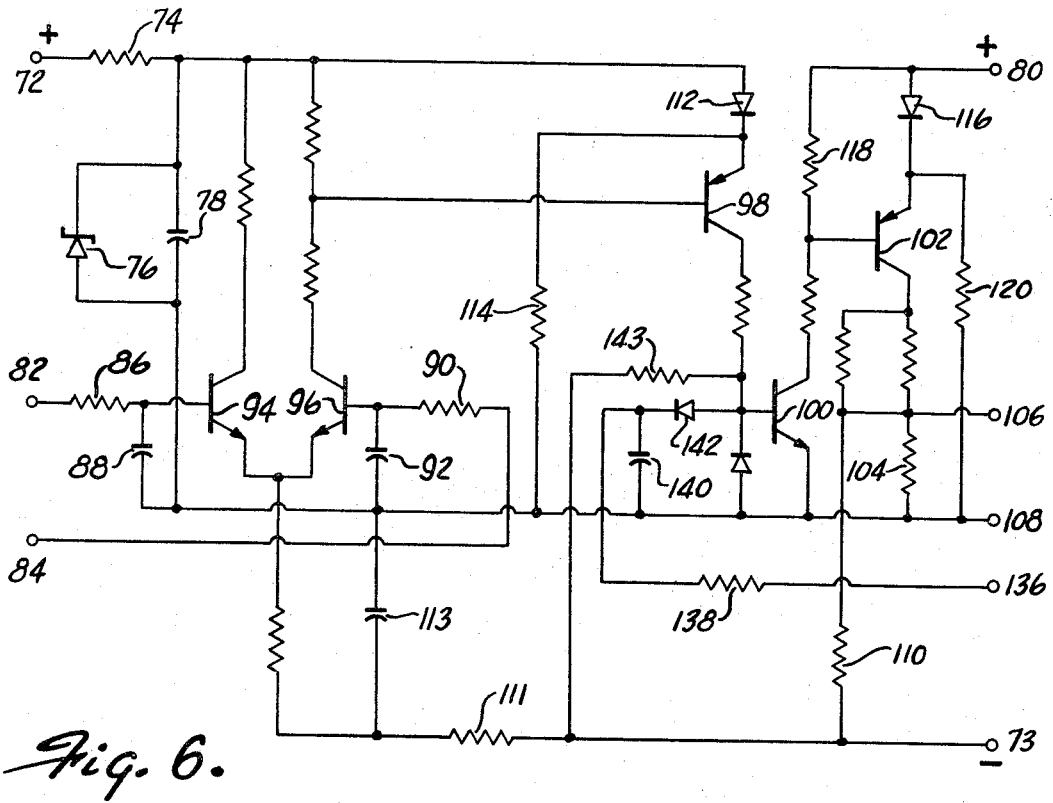
Fig. 6.
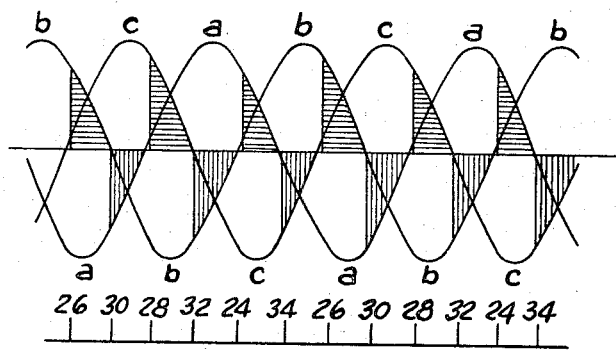
Fig. 5A.
Fig. 5B.
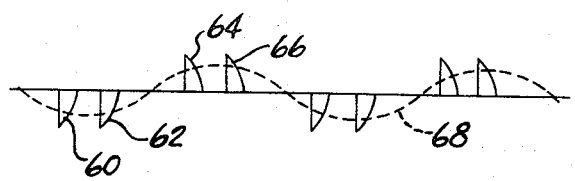
Fig. 5C.
INVENTORS.
JOHN G. HAUSER
JOHN D. STEADMAN
BY
Lieber & Nilles
ATTORNEYS

ERROR SIGNAL

INVENTORS.
JOHN G. HAUSER
JOHN D. STEADMAN
BY
Lieber & Nilles
ATTORNEYS

United States Patent Office 3,345,549
Patented Oct. 3, 1967

3,345,549
RECTIFIER BRIDGE ADJUSTABLE ALTERNATING CURRENT VOLTAGE CONTROL
John G. Hauser, Milwaukee, and John D. Steadman, New Berlin, Wis., assignors, by mesne assignments, to The Louis Allis Company, Milwaukee, Wis., a corporation of Delaware
Filed Mar. 9, 1965, Ser. No. 438,289
15 Claims. (Cl. 318—227)

This invention relates to control circuits for providing an adjustable output voltage and has, therefore, as its primary object the provision of an improved control of this type.

An additional object of this invention is to provide an improved adjustable voltage control of the above type which is adapted for use with alternating current motors to control the speed thereof.

Another object of this invention is to provide an adjustable voltage control which utilizes the motor as an impedance in series with the control to protect the control from excessive transient voltages.

Yet another object of this invention is to provide an adjustable voltage control which produces quieter, smoother operation of the alternating current motor than has been provided by prior art controls of this type.

A further object of this invention is to provide an improved adjustable voltage control which is adapted for use with high-slip alternating current motors in applications demanding a rising load curve.

Briefly, this invention provides for connecting the adjustable voltage control to one end of the polyphase windings of an alternating current motor and an alternating current power supply to the other end of the phase windings. The adjustable voltage control includes a double controlled rectifier bridge circuit which regulates motor line to neutral voltage according to the degree of conduction of the controlled rectifier elements. Firing amplifiers control the conducting state of the rectifier elements in the bridge circuit. These firing amplifiers employ alternating current signals corresponding to the alternating current power supply and a feedback signal corresponding to the difference between the desired and actual output conditions to provide firing signals to the controlled rectifiers in the bridge circuit in a manner to decrease the error between actual and desired conditions.

The invention, together with the above-stated and other objects, may be more fully understood by reference to the specification below and the following drawings, in which:

FIGURES 5a, 5b and 5c show the operation of the three-phase, double rectifier bridge circuit of the control in supplying adjustable output voltage;

FIGURE 6 is one embodiment of a firing amplifier that may be employed in the circuit of FIGURE 3;

While the control of this invention may be used in many applications requiring an adjustable voltage, several features of the control render it particularly adaptable for use in the control of alternating current motors. For this reason and because the invention is most easily explained in this context, it is shown as such in the present application. It will be appreciated, however, that the invention, in its broader aspect, is suitable for uses other than motor control.

Figure 1:
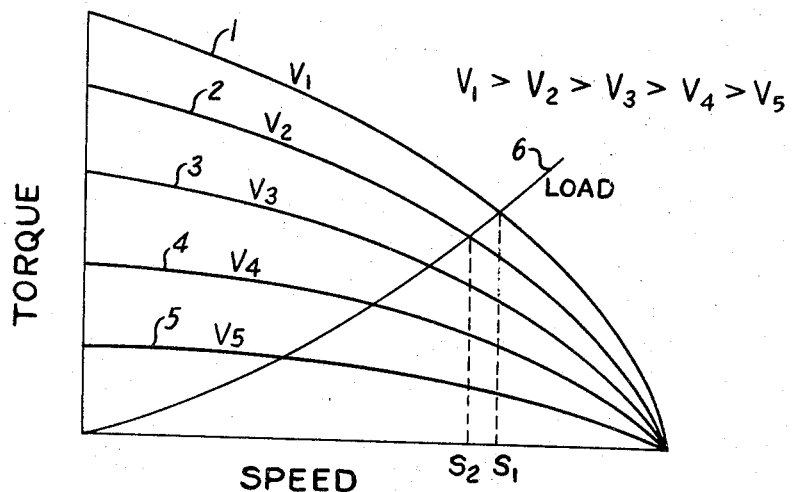
FIGURE 1 illustrates the speed torque curves of a high-slip, alternating current motor.

It is well known that an alternating current induction motor having a high secondary resistance, that is, rotor resistance, will provide, for any given applied voltage, an output torque which decreases as the rotor speed increases. Such a speed torque curve is shown in FIGURE 1 by the graph designated 1. Adjusting the voltage applied to the primary or stator of a high secondary resistance alternating current motor produces the family of speed torque curves shown in FIGURE 1 by the numerals 1 through 5. In this figure, the voltage applied to the stator of the motor to generate a particular speed torque curve is less than the voltage applied to the stator to generate the preceding speed torque curve. Thus, the voltage applied to the stator to generate speed torque curve 2 is less than the voltage applied to the stator to generate speed torque curve 1, while the voltage applied to generate speed torque curve 3 is less than the voltage applied to generate speed torque curve 2.

A high-resistance secondary alternating current motor having the characteristics shown in FIGURE 1 is ideally suited for driving a load with a rising load curve. Typical of such loads are fan loads and pump loads. The load curve of these types of loads is shown in FIGURE 1 by the numeral 6 and is such that as the speed of the load increases, the torque demanded by it also increases.

Speed control of the high-resistance secondary motor connected to such a load may be obtained by adjusting the magnitude of the voltage applied to the stator of the motor. As shown in FIGURE 1, if it is desired to increase the speed of the motor from a speed $S_2$ to $S_1$, it is necessary only to increase the voltage from the magnitude required to generate speed torque curve 2 to that required to generate speed torque curve 1. A means of supplying an adjustable voltage to the stator of the high-resistance secondary motor is the most common way of controlling the speed of such a motor and is particularly applicable in the instance of a fan or pump load.

Figure 2B:
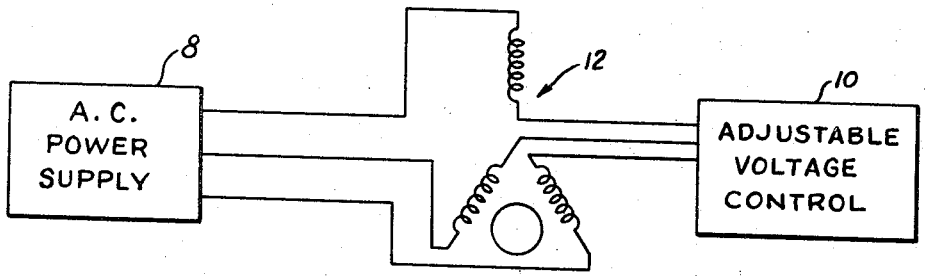
FIGURE 2b is a schematic diagram of an improved adjustable voltage control of the present invention.
Figure 2A:
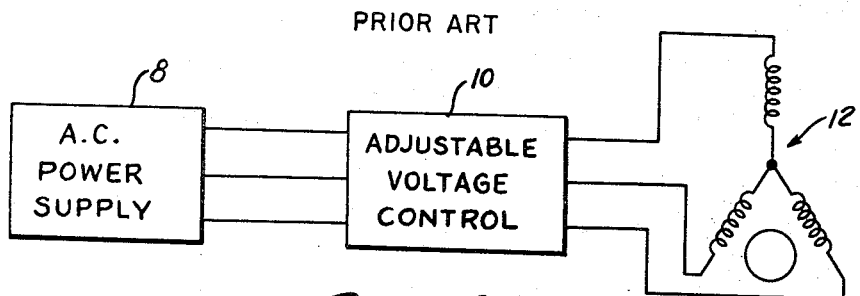
FIGURE 2a is a schematic diagram showing a prior art adjustable voltage motor control.

Referring now to FIGURE 2a, a prior art circuit for applying adjustable voltage to the stator of a high-resistance secondary alternating current motor is shown therein. This circuit provides an alternating current power supply 8 connected to an adjustable voltage controller 10 which takes the constant voltage, such as 220 or 440 volts, of the A.C. power supply 8 and provides a variable voltage output to center-connected stator windings 12. While such an arrangement has operated successfully in the past, it is subject to a number of deficiencies, the main one being that adjustable voltage control 10 is subjected to any excessive transient voltages that occur in A.C. power supply 8. When rectifier elements, and particularly silicon-controlled rectifier elements, are employed to provide the adjustable voltage output of adjustable voltage control 10, these elements may be damaged when the excessive voltage transients exceed the operating voltages of the rectifier elements.

FIGURE 2b shows the improved adjustable voltage control of the present invention. In this control, the alternating current power supply 8 is connected to one end of the various phase windings making up stator winding 12 of the motor. The other end of the phase windings of stator winding 12 is connected to the adjustable voltage control 10. It will be noted from FIGURE 2b that adjustable voltage control 10 now has connected in series therewith an impedance, that impedance being the phase windings of stator winding 12. This impedance tends to suppress excessive transient voltages occurring in alternating current power supply 8 and hence provides protection to the rectifier elements of adjustable voltage control 10.

Figure 3:
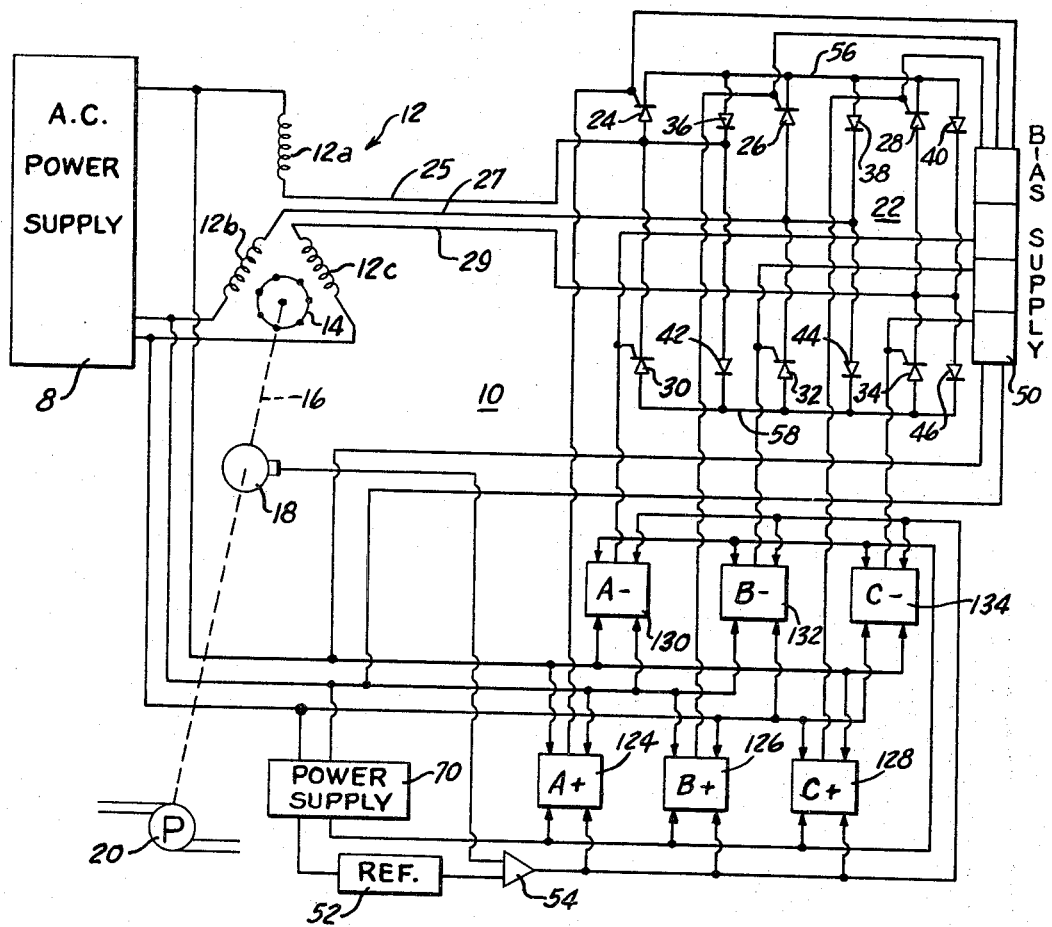
FIGURE 3 is a detailed schematic diagram of an adjustable voltage control of the present invention.

Referring now to FIGURE 3, a detailed schematic diagram of adjustable voltage control 10 is shown therein. Alternating current power supply source 8 provides a three-phase alternating current output, labeled for purposes of identification as phases A, B, and C. Each of the phase outputs of alternating current power supply 8 is connected to a phase winding in stator 12, these phase windings as being designated 12a, 12b, and 12c to indicate the output phase to which they are attached. A high-resistance rotor 14 is provided in operative relation to stator 12 and is driven by stator 12 in accordance with well-known induction motor principles. Rotor 14 is connected via output shaft 16 to a tachometer generator 18 which provides a signal proportional to the speed of the rotor, and to a load 20, shown illustratively as a pump.

Stator winding 12 is open at the center, and a lead from each of the phase windings 12a through 12c is connected to a double rectifier bridge circuit 22 in adjustable voltage control 10. One-half of the double rectifier bridge circuit is termed the positive half and is composed of controlled rectifiers 24, 26, and 28. The other half of double rectifier bridge circuit 22 is termed the negative half and is composed of controlled rectifiers 30, 32, and 34. Controlled rectifiers 24 through 34 have connected in parallel therewith diodes 36, 38, 40, 42, 44, and 46 connected to conduct in the opposite polarity as the controlled rectifiers 24 through 34. While the controlled rectifiers 24 through 34 may be of any type, they are shown as the silicon semi-conductor type in FIGURE 3. As such, the conduction state of the controlled rectifiers may be controlled by signals applied to the gate terminals of the rectifiers. The operation of double rectifier bridge circuit 22 will be described in detail subsequently; however, it may be stated summarily that its function is to provide for the application of an adjustable voltage to stator windings 12 from A.C. power supply 8 through a limitation on the conduction intervals or times of controlled rectifiers 24 through 34.

The conduction intervals of the controlled rectifiers in double rectifier bridge 22 are controlled by firing amplifiers 124, 126, 128, 130, 132, and 134 connected to the rectifiers having the same last two digits. Firing amplifiers 124 through 134 provide firing signals to controlled rectifiers 24 through 34 to initiate their conduction. A bias supply 50 biases the gates of controlled rectifiers 24 through 34 to prevent their being placed in the conducting stage except by a firing signal from amplifiers 124 through 134. While this bias supply is shown separately in FIGURE 3, it may in practice be combined with firing amplifiers 124 through 134 so that the latter circuits provide both the firing signal and the bias level.

Firing amplifiers 124 through 134 utilize a plurality of input signals to control the firing of controlled rectifiers 24 through 34. One such input signal is an alternating current signal similar to that supplied by alternating current power supply 8 to stator winding 12. The other such signal is the speed error signal produced by comparing a reference signal from reference source 52 with the feedback signal from tachometer generator 18 in an error-differential amplifier 54. The resultant output of error-differential amplifier 54 is a signal representing the difference between actual and desired motor speed. Amplifier 54 may be of any type capable of determining the difference between the reference signal and the feedback signal and producing an amplifier difference signal.

Figure 4:
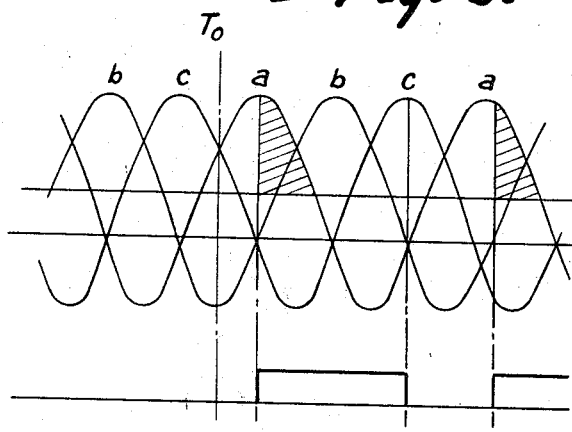
FIGURE 4 illustrates input signals to the firing amplifiers in FIGURE 3, showing the method of controlling the generation of firing signals.

The utilization of the alternating current phase signals by firing amplifiers 124 through 134 may be better understood by reference to FIGURE 4. FIGURE 4 shows the sinusoidal alternating current polyphase output of alternating current power supply 8, including power phases A, B, and C, which are applied through stator winding 12 to the double rectifier bridge circuit 22. The A phase power is applied to the anode of controlled rectifier 24 via conductor 25, while the B phase power is applied to the anode of controlled rectifier 26 through conductor 27. C phase power is provided to controlled rectifier 28 via conductor 29. The cathodes of all these rectifiers are tied together by common conductor 56. In the negative bank of double rectifier bridge circuit 22, the A phase power is applied to the cathode of controlled rectifier 30, the B phase power is applied to the cathode of controlled rectifier 32, and the C phase power is applied to the cathode of controlled rectifier 34. The anodes of controlled rectifiers 30 through 34 are connected by common conductor 58.

Referring now to FIGURE 4, that figure shows line to neutral voltages of power phases A, B, and C of alternating current power supply 8. It will be appreciated that in order for a controlled rectifier of double rectifier bridge circuit 22 to conduct power from alternating current power supply 8, it is necessary that the anode of the controlled rectifier be positive with respect to the cathode. Using phase A as an example, it may be seen that the earliest instant that controlled rectifier 24 may be placed in the conducting state is the instant labeled $T_0$ in FIGURE 4. This is due to the fact that if the preceding phase C controlled rectifier 28 is in the conducting state, the anode and cathode of that controlled rectifier will be at the same potential, disregarding the small potential drop across the controlled rectifier. The cathode of controlled rectifier 24 is also at the same potential as it is connected to the cathode of controlled rectifier 28 by common conductor 56. In effect then, the cathode of controlled rectifier 24 is connected to phase C while the anode is connected to phase A. Up until time $T_0$, the cathode is more positive than the anode. At time $T_0$, the anode assumes a more positive potential than the cathode, and if an appropriate firing signal is directed to the gate by firing amplifier 124, controlled rectifier 24 will conduct phase A power.

It is also to be noted from FIGURE 4 that at time $T_0$, the B phase power applied to both rectifier bridge 22 and the firing amplifiers is at its most negative value. This circumstance is utilized in control 10 to provide for control of the generation of firing pulses by firing amplifiers 124 through 134.

Control signals are developed by control circuit 10 from the output of alternating current power supply 8 which correspond, in phase relationship, to phases A, B, and C of the power supply. These signals are hereinafter termed "rider" signals and consist of a phase A rider signal, a phase B rider signal, and a phase C rider signal. A transformer may be used to step these signals down to a useable control level.

Taking again controlled rectifier 24 which controls phase A and firing amplifier 124, FIGURE 3 indicates that a phase B rider signal from power supply 8 is applied to amplifier 124 as an input signal. Also supplied to amplifier 124 is an input signal representing the speed error from differential amplifier 54. The firing amplifier 124 is so designed that when the phase B rider signal connected thereto exceeds the error signal, when the two are mixed in the input of the amplifiers, a firing signal is sent to the controlled rectifier 24. Thus, if the error signal is always of lesser magnitude than the phase B rider signal, the controlled rectifier 24 will be fired at the earliest possible moment, such as time $T_0$ and will remain conducting for the entire half cycle. If the error signal is always greater than the phase B signal, no firing signal will be generated by the firing amplifiers.

FIGURE 4 shows the intermediate situation where the phase B rider signal becomes of greater magnitude than the error signal at time $T_1$. At this point, firing amplifier 124 will generate a firing pulse to controlled rectifier 24 and that rectifier will conduct for the interval shown as the shaded portion in FIGURE 4. Unless otherwise modified, this firing signal will continue to be applied to the gate of controlled rectifier 24 until time T₂ when the phase B rider signal becomes less than the error signal. The firing signal will be reapplied to phase A at time T₃ when the phase signal again exceeds the error signal.

It will be appreciated that controlled rectifier 26 conducing phase B through stator winding 12b will be fired by amplifier 126 in the same manner as described above when the phase C rider signal connected thereto exceeds the error signal, and controlled rectifier 28 conducting the phase C voltage through stator winding 12c will be turned on by amplifier 128 when the phase A rider signal exceeds the error signal. Amplifiers 130 through 134 operate in a similar manner to provide for current flow through controlled rectifiers 30 to 34 in the negative half of double rectifier bridge circuit 22.

Referring now to FIGURE 5, the operation of the double rectifier bridge circuit 22 in providing power through stator winding 12 is illustrated therein. FIGURE 5a shows the line to neutral voltages of the phases A, B, and C which are supplied by A.C. power supply 8 to stator winding 12 and double rectifier bridge circuit 22. The shaded portions of FIGURE 5a show the load voltage in the phase windings of stator winding 12. FIGURE 5b shows the firing signals applied to controlled rectifiers 24 through 34. For clarity only, the point of initiation of the firing signal is shown in FIGURE 5b, it being understood that firing signals continue for the time interval shown in FIGURE 4.

Starting at the left side of FIGURE 5a, the first phase through which power may be conducted is the positive half cycle of phase B. To accomplish this, controlled rectifier 26 is turned on by firing amplifier 126 by a firing signal generated in the above-described manner. FIGURE 5b indicates that controlled rectifier 26 is conducting at this point. It will continue to conduct until phase B enters its negative half cycle and reverse biases controlled rectifier 26.

Referring again to FIGURE 5a, the next phase which may be utilized to conduct power through double rectifier bridge circuit 22 is the negative half cycle of phase A. This requires turning on controlled rectifier 30 connected to phase A in the negative half of double rectifier bridge circuit 22 by generating a firing signal in amplifier 130. The subsequent phase through which power may be conducted is the positive half cycle of phase C which necessitates turning on controlled rectifier 28. This is followed by the firing of controlled rectifier 32 to conduct power through negative half cycle of phase B. The cycle is completed by the conduction of power through the positive half cycle of phase A and the negative half cycle of phase C, accomplished by turning on controlled rectifiers 24 and 34, respectively. A complete cycle consists of turning on each of the six controlled rectifiers in double rectifier bridge circuit 22 in the sequence shown in FIGURE 5b to produce the result shown in FIGURE 5a.

The effect of the above cycle of operation on a single phase winding of stator winding 12 is shown in FIGURE 5c. This figure shows power transmission through winding 12a of stator winding 12. For purposes of this explanation, power flowing from alternating current power supply 8 through winding 12a to adjustable voltage control 10 is assumed to be in the positive direction, while power flowing back into A.C. power supply 8 through phase winding 12a and adjustable voltage control 10 is assumed to be in the negative direction. When controlled rectifier 26 in double rectifier bridge circuit 22 is fired on, the following takes place: power flows from alternating current power supply 8 through phase winding 12b of stator winding 12, through conductor 27, through controlled rectifier 26 which is in the conducting state, through conductor 56, through diode 36, through conductor 25, through phase winding 12a, back to alternating current power supply 8. This power path is dictated by the fact that phase B is of a positive polarity during this time interval, while phase A is of a negative polarity, as may be seen by reference to FIGURE 5a. Thus, the power flows from the positive phase B to the negative phase A, and in doing so, passes from adjustable voltage control 10 through phase winding 12a to alternating current power supply 8. Employing the convention stated above, the power flow through phase winding 12a is toward alternating current power supply 8 and hence in a negative direction. The power transmitted through phase A is indicated by the graph 60, shown in the negative direction in FIGURE 5c.

The next controlled rectifier to be turned on by the firing sequence dictated by the phase rider signals and error signal applied to the firing amplifiers is controlled rectifier 30 in phase A of the negative half of double rectifier bridge circuit 22. At this instant, phase C is of a positive polarity so power will flow from alternating current power supply 8 through phase winding 12c of stator winding 12, through conductor 29, through diode 46, through conductor 58, through controlled rectifier 30, through conductor 25, through phase winding 12a, and back to alternating current power supply 8. As the power is again flowing through phase winding 12a toward alternating current supply source 8, the current is again in the negative direction and is indicated by the graph 62 of FIGURE 5c.

Controlled rectifier 28 is the next to be fired. This allows current to flow from alternating current power supply 8 through phase winding 12c, through conductor 29, through controlled rectifier 28, through conductor 56, through diode 38, through conductor 27, through phase winding 12b, and back to alternating current power supply 8. During the conduction interval of this controlled rectifier, the power flows from the C phase to the B phase and does not affect phase A. Thus, no graph is shown in FIGURE 5c for power transmitted during the conduction interval of this controlled rectifier.

Controlled rectifier 32 in the B phase of the negative half of double rectifier bridge circuit 22 is the next to be sequentially fired. At this instant, phase B in FIGURE 5a is negative, while phase A in the same figure is positive. Thus, current will flow from A.C. power supply 8 through phase winding 12a, through conductor 25, through diode 42, through conductor 58, through controlled rectifier 32, through conductor 27, through phase winding 12b, and back to power supply 8. As the power flows from the power supply 8 through phase winding 12a to adjustable voltage control 10, this power is deemed positive by the convention adopted above and hence is shown as positive graph 64 in FIGURE 5c.

The fifth rectifier to be fired in the operating sequence is controlled rectifier 24. This rectifier is in phase A of the positive half of double rectifier bridge circuit 22 and conducts power between positive phase A and negative phase C as shown in FIGURE 5a. The power flows from alternating current power supply 8 into phase winding 12a, through conductor 25, through controlled rectifier 24, through conductor 56, through diode 40, through conductor 27, through phase winding 12c, and back to alternating current power supply 8. As power is flowing into the phase winding 12a from alternating current supply source 8, this power is designated as positive and is shown by the graph 66 in FIGURE 5c.

The final rectifier to be fired in one operating cycle of adjustable voltage control 10 is controlled rectifier 34 in the C phase of the negative half of double rectifier bridge circuit 22. This controlled rectifier allows power to flow in phase B through phase winding 12b, through conductor 27, through diode 44, through controlled rectifier 34, through conductor 29, through phase winding 12c, and back to alternating current power supply 8. As the power flows from phase C to phase B, phase A is unaffected, and no graph is shown in FIGURE 5c for power conducted during this interval.

This completes one operating cycle of the controlled rectifiers in double rectifier bridge circuit 22 of adjustable voltage control 10. As seen in FIGURE 5c, the result in any given phase, phase A being taken as exemplary in FIGURE 5, is the production of an alternating current through the phase winding having a voltage determined by the conduction interval of controlled rectifiers 24 through 34. It is to be noted that the frequency of the voltage applied to stator winding 12 is not altered by the operation of adjustable voltage control 10. Thus, the power conduction through phase A indicated by the graphs 60 and 62 both occur while the phase A power from alternating current power supply 8 is negative. Likewise, the power conductions indicated by graphs 64 and 66, these graphs being in the positive direction, occur while the phase A voltage supplied by power supply 8 is also positive. When the power conductions shown by graphs 60 through 66 are filtered by the inductance of stator winding 12, the result is a voltage through phase A of the same frequency as the applied power, but of a magnitude determined by the firing intervals of controlled rectifiers 24 through 34.

It is to be noted that the provision of a double rectifier bridge circuit in adjustable voltage control 10 provides for two groups of closely consecutive power conductions through the phase windings of stator winding 12. Thus, graphs 60 and 62 of FIGURE 5c both in the negative direction combine to make the negative half cycle of power conduction through stator winding 12a. Graphs 64 and 66 in the positive direction likewise combine to provide the positive half cycle of power conduction through stator winding 12a. Had a single rectifier bridge circuit been utilized, the positive or negative half cycle of voltage through any given phase winding would comprise one large power conduction as compared with the two smaller power conductions provided by the double rectifier bridge circuit. The latter is most advantageous in providing for smooth, quiet operation of the alternating current motor. When large, widely spaced power conductions, such as are provided by a single rectifier bridge circuit, are applied to the alternating current motor, jerky or erratic operation results. This type of operation is eliminated by adjustable voltage control 10 by the provision of more closely spaced but smaller double pulses of power conduction.

FIGURE 6 shows a schematic circuit diagram for a firing amplifier that may be used to fire the controlled rectifiers in the positive half of double rectifier bridge circuit 22. Power to operate this amplifier is supplied by power supply 70 to terminals 72 and 73. The input to terminal 72 is decoupled by a decoupling circuit comprised of capacitor 78 and zener diode 76. The input to terminal 73 is likewise decoupled by capacitor 113 and resistor 111. Power supply 70 is also connected to terminal 80 to provide power for conversion to firing signals to the controlled rectifiers.

The speed error signal from amplifier 54 is connected to terminal 82 and is filtered through resistor 86 and capacitor 88. The phase rider signal corresponding to one of the phases of alternating current power supply 8 is connected to terminal 84 and is filtered through resistor 90 and capacitor 92. The error signal is applied from terminal 82 to the base terminal of transistor 94, and the phase signal is applied from terminal 84 to the base terminal of transistor 96 in a manner such that when the phase signal exceeds the error signal, transistor 96 saturates. The saturation of transistor 96 provides a signal to the base of transistor 98, placing that transistor in the saturated state. Transistor 98 turns on transistor 100 which in turn turns on transistor 102. When transistor 102 is turned on, power from power supply 70 connected to terminal 80 develops a voltage across resistor 104. This provides a firing signal from terminal 106, connected to the gate of the controlled rectifier to terminal 108, connected ot the cathode, turning on the controlled rectifier connected to these terminals.

It may be noted from FIGURE 3 that the cathodes of all the controlled rectifiers in the positive half of double rectifier bridge circuit 22 are commonly connected by conductor 56. They are also connected in common to the low of power supply 8. This arrangement allows a firing signal, positive in relation to the cathodes connected to terminal 108, to be produced at terminal 106 to turn on the controlled rectifier. During the time the rectifier is not conducted, that is when the phase signal to the firing amplifier does not exceed the error signal thus preventing saturation of transistor 96, it is desirable to reverse bias the gate of the non-conductive rectifier to insure that the rectifier remains in the non-conducting state. This may be provided by a separate bias circuit 50 in FIGURE 3 or may be provided, as in FIGURE 6, by a voltage divider consisting of resistors 110 and 104 extending between the power supply 70 connected to terminal 73 and terminal 108. Resistors 110 and 104 are of such a magnitude that sufficient voltage is developed at terminal 106, connected between the resistors, to provide a reverse voltage to the gate terminal of the controlled rectifier to insure its remaining in the non-conductive state until a firing signal is produced at terminal 106 by current through transistor 102 in the conductive state. Thus, both a positive signal to the gate to fire the controlled rectifier and a negative signal to the gate to insure the controlled rectifier remains in a non-conducting state may be applied to the rectifier without the necessity of a transformer or other isolation means.

Transistor 98 is reversed biased until transistor 96 saturates by diode 112 and resistor 114. Transistor 102 is likewise reverse biased by diode 116, resistor 118, and resistor 120.

The reverse biasing circuit for transistor 100 to prevent its turn on before transistor 96 saturates is different than the reverse bias circuit described above. The necessity for this difference is shown more clearly in FIGURE 7 which resembles FIGURE 4 in that it shows the generation of firing pulses by the firing amplifier in response to the phase rider signal applied to terminal 84 and the speed feedback signal applied to terminal 82. As has been noted previously, the firing amplifier as shown in FIGURE 6 generates a firing pulse at terminals 106 and 108 when the phase rider signal to terminal 84 exceeds the error signal at terminal 82. In an exemplary instance where the firing amplifier is connected to the phase A positive rectifier 24, the phase rider signal applied to terminal 84 will be phase B. Thus, a firing signal will be generated at terminal 106 at time $T_1$ turning on controlled rectifier 24 in double rectifier bridge circuit 22. This control signal will remain applied to the gate terminal of control rectifier 24 until time $T_2$, that is, until the phase B rider signal applied to terminal 84 becomes less than the error signal applied to terminal 82. At this point, transistor 96 becomes unsaturated, removing the remaining transistors in the firing amplifier circuit from the saturated state and causing a cessation of the firing signal at terminal 106.

Figure 7:
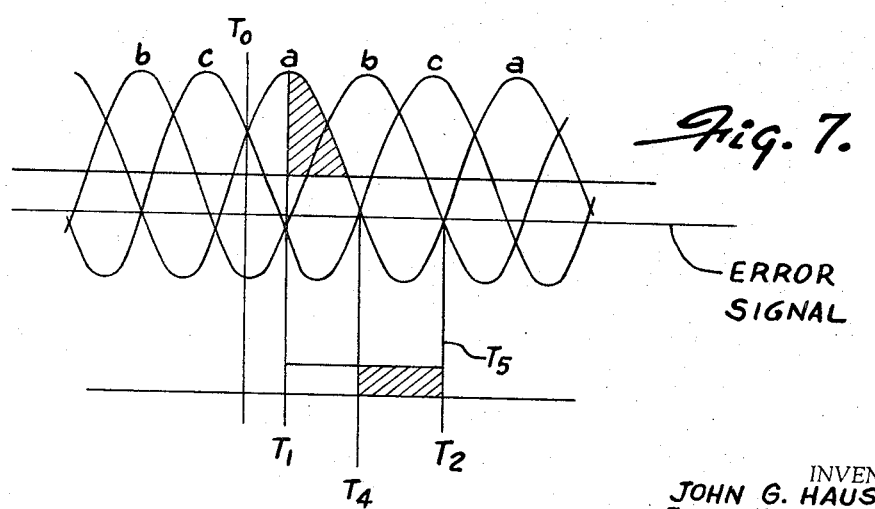
FIGURE 7 illustrates the input signals to the firing amplifiers in FIGURE 3 and, in further detail, the employment of these signals.

Referring to FIGURE 7 and particularly to the graph of phase A, it will be noted that between times $T_4$ and $T_5$, the voltage applied to controlled rectifier 24 will be at its greatest negative magnitude. This is also the most negative voltage in the three-phase power output from alternating current supply source 8, as phase C or phase B are either less negative or positive during this time interval. Controlled rectifier 24 is thus subjected to the maximum reverse voltage during this time interval. If a gate signal is applied to the gate during this time interval, an additional strain is placed on the controlled rectifier 24. The presence of a positive firing signal on the gate during the time the anode is negative increases the leakage current in the controlled rectifier and materially reduces its life.

In the instance shown in FIGURE 4, a firing signal would normally be applied to the gate of controlled rectifier 24 from time $T_1$ to time $T_2$, that is, the time interval during which the phase B rider signal exceeds the error signal. However, as explained above, the presence of a firing signal on the gate terminal of controlled rectifier 24 during the time interval between $T_4$ and $T_5$ is detrimental to the controlled rectifier. Hence, circuitry is provided in the reverse biasing circuit for transistor 100 to remove the signal from the gate terminal of controlled rectifier 24 subsequent to time $T_4$. Such a signal removal may be termed "blanking."

This is done by providing a blanking signal input to terminal 136 of the firing amplified corresponding to the phase of A.C. power connected to the controlled rectifier which the firing amplifier controls. Using the present example wherein the controlled rectifier connected to terminals 106 and 108 controls phase A, a phase A blanking signal would be applied to terminal 136, as shown in FIGURE 6. This signal is filtered by resistor 138 and capacitor 140 and is applied to the base terminal of transistor 100 in a manner such that when the phase A voltage attains the negative value at time $T_4$, transistor 100 is biased off by this negative signal applied to its base terminal through diode 142. The turn-off of transistor 100 turns off transistor 102 removing the firing signal from terminal 106 and hence the gate of controlled rectifier 24. This prevents a positive gate signal from being applied to controlled rectifier 24 during the time it is experiencing maximum reverse voltage, materially prolonging the life of controlled rectifier 24. Additional reverse bias is applied to the base terminal of transistor 100 by resistor 143 which insures that transistor 100 is off when transistor 98 is off regardless of the signal applied to terminal 136.

The firing amplifier for the controlled rectifier of any given phase thus has four input signals applied to it: an input from the power supply 70 to provide power for operation of the amplifier and for the generation of firing signals and reverse bias signals; an error signal constituting the difference between the reference and the feedback signals; a phase rider signal which along with the feedback signal is used for the generation of firing signals; and a blanking signal of the phase to which the controlled rectifier is connected to remove firing signals from the controlled rectifier during periods of maximum reverse voltage.

Figure 8:
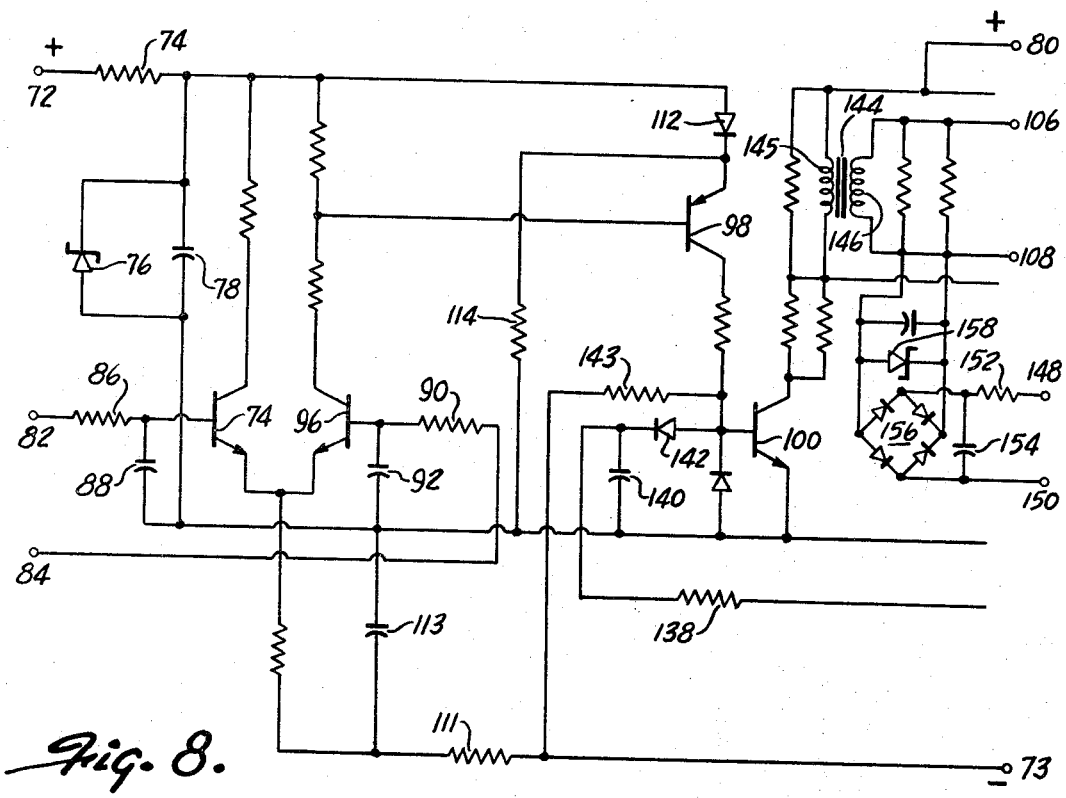
FIGURE 8 is another embodiment of a firing amplifier that may be employed in the circuit of FIGURE 3.

FIGURE 8 shows a firing amplifier which is suitable for use in firing the controlled rectifier of the negative half of double rectifier bridge circuit 22. As may be noted from FIGURE 3, the cathodes of the controlled rectifiers in the negative half of double rectifier bridge circuit 22 are connected to the various phase windings in stator winding 12. This prevents the cathodes from being tied together and to a common point and hence requires the firing amplifier to be transformer coupled to the gate and cathode of the controlled rectifiers in order to supply both a positive and a negative signal to the gate. The firing amplifier shown in FIGURE 8 is similar to that shown in FIGURE 6 with the exception of this transformer. The primary winding 145 of transformer 144 is connected to the output of transistor 100 and supplies a positive firing pulse to gate terminal 106 via secondary winding 146. During the time when a positive signal is not applied to terminal 106, a negative bias is supplied via bias supply 50 through terminals 148 and 150. This signal, when filtered by resistor 152 and capacitor 154, passed through rectifier bridge 156, and regulated by zener diode 158, is applied to terminals 106 and 108 to provide the reverse biasing signal.

The expositions in this case have been by way of exemplary description, and it is understood that variations and modifications may be made therein without departing from the scope of the invention. It is intended to cover in the appended claims all such variations and modifications.

Various modes of carrying out the invention are contemplated as being within the scope of the following claims particularly pointing out and distinctly claiming the subject matter which is regarded as the invention.

What is claimed is:

1. An adjustable voltage control for providing a variable bipolarity polyphase voltage of any desired magnitude to a polyphase load connected between the control and a source of polyphase alternating current voltage, said load having a phase voltage conductor for each phase of said polyphase voltage extending between the source and the control, said voltage being provided by connecting the phase voltage conductors in the control so as to permit the alternating current voltage to be applied to the load, said control comprising:

a rectifier bridge including a pair of controlled rectifiers connected to each phase conductor of the load, the conduction state of said controlled rectifiers being sequentially controllable to connect the conductors to apply selected portions of the alternating current voltage of either polarity to the load to form the variable bipolarity polyphase voltage of the desired magnitude;

firing amplifiers connected to each of said controlled rectifiers and to a means providing a signal proportional to the desired magnitude of the bipolarity polyphase voltage, said firing amplifiers being responsive to said proportional signal to provide firing signals to the controlled rectifiers to sequentially render them conductive to connect the load phase voltage conductors and apply the selected portions of the alternating current voltage of either polarity to the load, said load serving as the series impedance to the controlled rectifiers to protect them from transient conditions in the polyphase alternating current voltage.

2. The adjustable voltage control according to claim 1 wherein said rectifier bridge includes a pair of diode connected to each phase conductor of the load and wherein said controlled rectifiers and diodes apply selected portions of the line to neutral voltages of the polyphase alternating current voltage to the load conductors.

3. The control of claim 1 including a bias supply means for providing a signal of opposite polarity to the firing signal to the controllable rectifiers during intervals when a firing signal is not applied therto to insure said rectifiers remaining in the non-conductive state.

4. The control of claim 1 wherein said firing amplifier includes means for preventing the application of firing signals to the controllable rectifiers when the phase of the polyphase alternating current source to which the rectifier is connected applies maximum reverse voltage to the controlled rectifier anode.

5. The control of claim 4 including a bias supply means for applying a signal opposite to the polarity to the firing signal to the controlled rectifiers during the time a firing signal is not applied thereto to insure the controllable rectifier remaining in the non-conducting state and wherein the means for preventing the application of a firing signal to the rectifier during periods of maximum reverse voltage comprises:

means connecting to the firing amplifier a phase signal of the phase to which the controllable rectifier operated by the firing amplifier is connected; and means in the firing amplifier to sense the maximum reverse voltage of the phase signal and prevent a firing signal from being applied to the controllable rectifier and to apply a signal of the opposite polarity from said bias supply means thereto.

6. The adjustable voltage control according to claim 1 including a means connecting said polyphase alternating current voltage to said firing amplifiers, said firing amplifiers containing means responsive to the signal proportional to the desired magnitude of the variable polyphase voltage and to said polyphase alternating current voltage to provide firing signals to the controlled rectifiers to apply selected portions of the alternating current voltage of either polarity to the load.

7. The adjustable voltage control according to claim 6 wherein said firing amplifiers include means to detect when the polyphase alternating current voltage exceeds the signal proportional to the desired magnitude of the bipolarity polyphase voltage and to generate a firing signal to render the controlled rectifiers connected thereto conductive at such time to apply the selected portions of the alternating current voltage to the load.

8. The control according to claim 6 wherein said means comprises a means connecting each of the firing amplifiers to a phase signal of the phase of the polyphase alternating current voltage succeeeding the phase in the load conductor to which the controlled rectifier rendered conductive by the firing amplifier is connected.

9. The adjustable voltage control according to claim 2 wherein the firing amplifiers provide firing signals to the controlled rectifiers to sequentially render them conductive so as to alternately apply, to a given load conductor, a plurality of selected portions of said line to neutral voltages of one polarity and a plurality of selected portions of said line to neutral voltages of the other polarity, thereby to form the variable bipolarity polyphase voltage to the load.

10. An adjustable voltage control for providing operative condition regulation to an alternating current motor by adjusting a bipolarity polyphase voltage applied to motor stator windings connected between the control and the phases of a source of polyphase alternating current voltage by connecting the stator windings so as to permit the alternating current voltage to be applied to the windings, said regulation being in accordance with a motor operative condition error signal, said control comprising:

a rectifier bridge including a pair of controlled rectifiers connected to each stator winding in the motor, the conduction interval of said controlled rectifiers sequentially controllable so as to connect the stator windings to the motor to apply selected portions of the alternating current voltage of either polarity to the windings to form the variable bipolarity polyphase voltage;

firing amplifiers connected to each of said controlled rectifiers for providing firing signals thereto;

feedback means providing a signal proportional to the actual condition of the motor;

regulator means providing a signal proportional to the desired condition of the motor;

means connected to said feedback means and to said regulator means and to said firing amplifiers to determine the difference between the signal proportional to the desired motor conditions and the signal proportional to the actual motor conditions, to produce an error signal corresponding thereto and to apply the error signal to the firing amplifiers; and means conecting the polyphase alternating current voltage to said firing amplifiers, said firing amplifiers containing means responsive to the error signal and to the alternating current voltage to provide firing signals to said rectifiers proportional to said error signal to sequentially render said rectifiers conductive to connect the stator windings and apply the selected portions of the polyphase alternating current voltage to said windings to form a variable bipolarity polyphase voltage proportional to said error signal to permit actual motor conditions to approach desired motor conditions, and whereby the stator windings provide a series impedance to the controlled rectifiers to protect them from transient conditions in the polyphase alternating current voltage.

11. The adjustable voltage control, according to claim 10, wherein said rectifier bridge includes a pair of diodes connected to each of said stator windings and wherein said controlled rectifiers and diodes apply selected portions of the line to neutral voltages of said polyphase alternating current voltage to said stator winding and wherein said means connecting polyphase alternating current voltage to said firing amplifiers comprises means connecting each of said firing amplifiers to a phase signal of the phase of the polyphase alternating current voltage succeeding phase in the stator windings to which the controlled rectifier operated by the firing amplifier is connected, each of said firing amplifiers containing means to detect when the phase signal exceeds the error signal and to generate a firing signal to initiate conduction of the controlled rectifier at such time to provide the selected portions of said line to neutral voltage to said stator windings to permit actual motor conditions to approach desired motor conditions.

12. The control of claim 11 including a bias supply means for providing a signal opposite in polarity to the firing signal to the controllable rectifiers during intervals when a firing signal is not applied thereto to insure said rectifiers remaining in the non-conductive state.

13. The control of claim 11 wherein said firing amplifier includes means for preventing the application of firing signals to the controllable rectifiers when the phase of the polyphase alternating current source to which the controllable rectifier is connected applies maximum reverse of voltage to the rectifier.

14. The control of claim 13 including a bias supply means for applying a signal of opposite polarity to the firing signal to the controllable rectifiers during the time a signal is not applied thereto to insure the controllable rectifier remaining in the non-conductive state and wherein the means to prevent a firing signal to the controllable rectifier during periods of maximum reverse voltage comprises:

means connecting the firing amplifier to a phase signal of the phase to which the controllable rectifier operated by the firing amplifier is connected; and means in the firing amplifier to sense the maximum reverse voltage of the phase signal and prevent a firing signal from being applied to the controllable rectifier and to apply a signal of the opposite polarity from the bias supply means thereto.

15. The adjustable voltage control of claim 11, wherein said firing amplifiers generate firing signals to said controlled rectifiers to sequentially render them conductive so as to alternately apply, to any given stator winding, a plurality of selected portions of said line to neutral voltages of one polarity and a plurality of selected portions of said line to neutral voltages of the other polarity to form the variable bipolarity polyphase voltage proportional to said error signal.

References Cited

UNITED STATES PATENTS

| | | | |
|---|---|---|---|
| 2,579,574 | 12/1951 | Herchenroeder | 318—227 |
| 2,876,406 | 3/1959 | Charbonneaux et al. | 318—227 |
| 2,894,191 | 7/1959 | Charbonneaux et al. | 318—229 |
| 3,229,179 | 1/1966 | Hetzel | 318—138 |

BENJAMIN DOBECK, *Primary Examiner.*

ORIS L. RADER, *Examiner.*

G. RUBINSON, *Assistant Examiner.*